Feb. 20, 1962 C. B. GETTYS ETAL 3,022,486
AUTOMATIC PROPORTIONAL PRESET OF AMPLIFIER GAIN
Filed Sept. 15, 1950
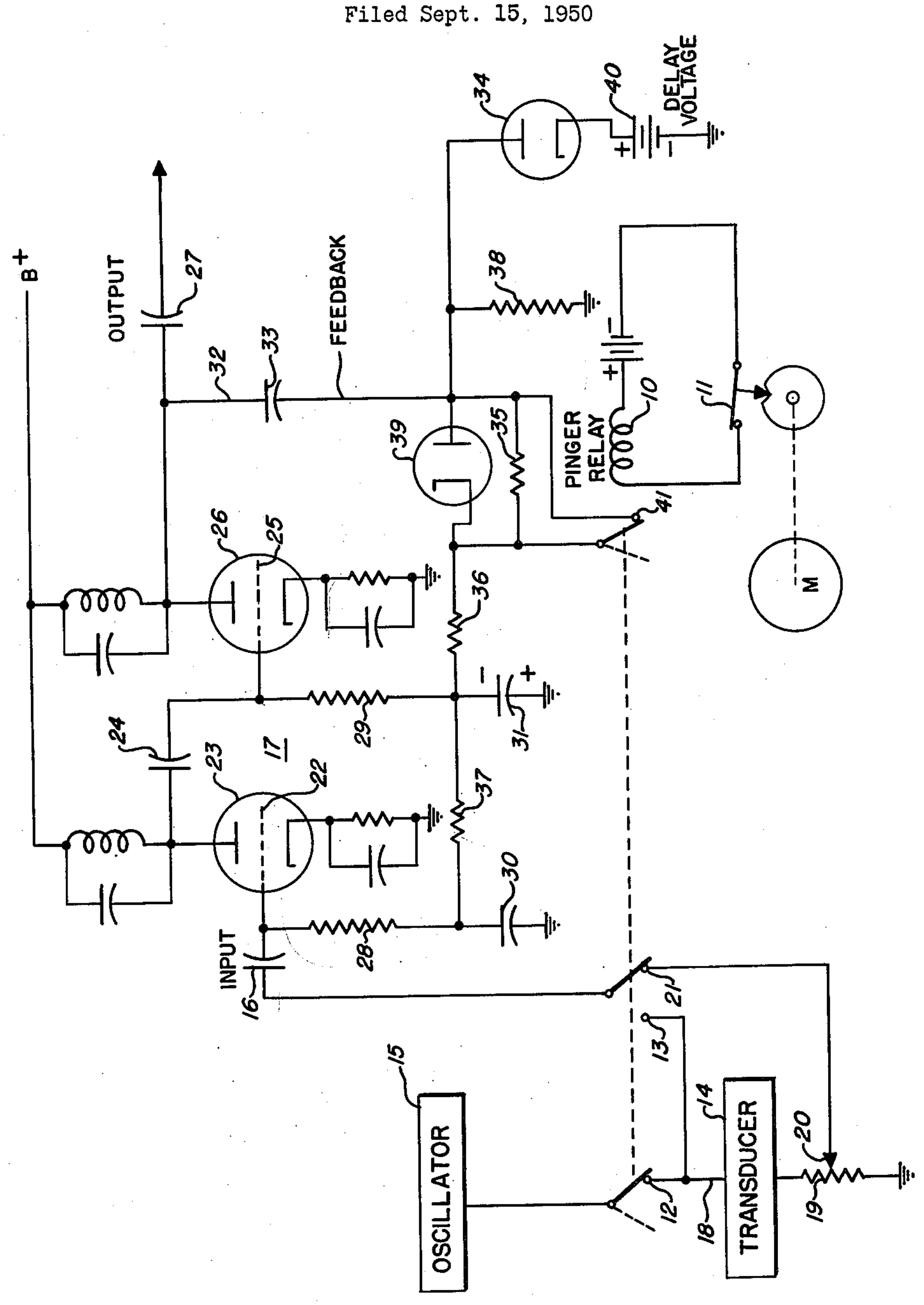
INVENTORS
CHARLES BRIGGS GETTYS
STEPHEN C. LEONARD
BY G. D. O'Brien
ATTORNEY

3,022,486
AUTOMATIC PROPORTIONAL PRESET OF AMPLIFIER GAIN

Charles Briggs Gettys, Pittsfield, and Stephen C. Leonard, Cheshire, Mass., assignors, by mesne assignments, to the United States of America as represented by the Secretary of the Navy Filed Sept. 15, 1950, Ser. No. 184,938
2 Claims. (Cl. 340—3)

The invention relates to improvements in echo signalling systems to automatic gain control amplifiers for echo signal receiving systems and to means automatically presetting the initial gain of an echo signal amplifier.

In the operation of the underwater echo ranging type torpedo, an electroacoustic transducer projects short pulses or pings of high frequency energy into the water at definite intervals of time. If any of these pulses strike an obstacle in the water ahead of the torpedo, an echo is reflected back and picked up by the transducer which translates the returning acoustic signal into a corresponding electric signal. This signal is processed by a receiver including control circuits which set the rudders to direct the torpedo toward the target.

After the pulses of high frequency energy are sent out, numerous false echoes reverberate from particles in the water, thermoclines and from the water surface or bottom. Fortunately the strength of these reverberation signals normally falls off rapidly with distance of the reflecting obstacle from the point of transmission and therefore with time after transmission. As an average the decay of reverberation has an exponential characteristic which can be approximated by the discharge rate of a capacitor through a resistance. If the reverberation decay characteristic were always the same, a receiver having a definite increasing gain with time could be made to always disregard the reverberation and still have maximum sensitivity to true echo signals. Since reverberation is variable, the development of a suitable receiver circuit enabling echo control of a torpedo is based upon the principle of distinguishing the true echo from unwanted reverberations by their relative magnitudes. This may be done by continuously increasing the sensitivity of the receiver during the intervals between transmitted pulses, as by using a fixed time-variation-of-gain (TVG) amplifier stage adjusted for the best match to average reverberation followed by an automatic volume control (AVC) amplifier stage to reduce any residual after the TVG stage. Alternatively, a reverberation-controlled gain (RCG) circuit dispensing with a separate TVG control and providing means varying the gain inversely of variations in reverberation may be used.

With either of the above-mentioned types of receivers, a condition exists which may be exploited to give positive control over initial sensitivity. If a signal is applied to such a receiver for a sufficiently long time, after the transient is over there will be at the output of the receiver its characteristic regulated voltage. This output voltage, in the steady state, remains at substantially the same value no matter what steady state input is applied. But the D.C. voltage on the gain control capacitor or capacitors of the amplifier control grids does not stay constant with different steady-state levels of input signal. For any value of input signal, within the operating range of the receiver, there will be a certain value of negative voltage, increasing in magnitude as the input signal is held at a higher steady state level. By adjustment of this negative voltage on the gain control capacitor or capacitors the initial sensitivity of the receiver can be varied. If the input signal is less than that required to keep a certain negative voltage on the gain control capacitor or capacitors, the regulated voltage will momentarily fall until a new condition of equilibrium at a lower negative capacitor voltage has been reached, and the gain of the receiver is restored to permit the constant value of regulated voltage.

By applying to the receiver during the period of transmission a signal derived from the transducer voltage or current, the receiver is stabilized during transmission at this signal level and the initial sensiitvity of the receiver at the start of the listening period is determined. For any power level delivered to the transducer there will be a corresponding level of maximum initial reverberation and echo strength. Should the transmitter electrical power vary during the course of the torpedo run, the receiver will accurately follow the change. Such changes may be caused by gradual heating of the tubes; by decrease of potentials due to supply exhaustion, by loss of a transmitter tube in a bank of parallel tubes or by drift of the master oscillator frequency. Likewise, variations in receiver gain resulting from changes in tuning or in tube supply potentials may occur.

The primary object of the present invention is to provide, in an echo signal or analogous receiving system, means for adjusting its initial gain so that the sensitivity of the system at the beginning of each listening interval is correct for an expected ratio of echo signal to transmitted pulse.

Other objects and advantages of the invention will become apparent during the course of the following description, taken in connection with the accompanying drawing, forming a part of this specification.

The single figure of the drawing is a diagrammatic view of the invention applied to an RCG circuit.

In the drawing, the numeral 10 designates a pinger relay energized during transmission intervals as by means of a motorized cam-operated switch 11. The pinger relay 10 is provided with contacts 12, 13 through which a transducer 14 is alternately connected to an oscillator 15 and to the input coupling condenser 16 of an RCG receiver 17. Connected in the transducer power line 18 is a resistor 19 adapted to supply, through an adjustable tap 20 and pinger relay contact 21, a high frequency alternating voltage signal to the control grid 22 of the RCG first stage amplifier tube 23 during the period of transmission when the pinger relay is closed, as shown in the drawing. A coupling condenser 24 connects the first stage amplifier output to the control grid 25 of a second stage amplifier tube 26 provided with an output coupling condenser 27.

The grid circuits of the amplifier tubes 23, 26 include resistors 28, 29 and gain control condensers 30, 31, respectively. A negative charge is applied to these condensers 30, 31 through an amplifier output return circuit 32 energized by the second stage amplifier output. This amplifier output return circuit 32 includes a condenser 33 passing the oscillatory signal output of the amplifier tube 26, a delayed rectifier 34 adapted to remove the positive component of this oscillatory signal output, and a resistor 35 normally transmitting the negative component to the condensers 30, 31 through resistors 36, 37. A resistor 38 in series with the charging resistors 35—37 provides for the discharge of the condensers 30, 31. To meet a variety of reverberation conditions, it is advantageous to provide gain control for increasing as well as for decreasing reverberation. The time constants of the gain adjustment in opposite senses depend on a number of factors. The adjustment to an increasing signal must not be so rapid that the desired echo signal is lost, yet increasing signals of slower character must be removed. The adjustment for decreasing reverberation cannot be appreciably slower than some average rate at which the signals decrease with range, but it may be faster provided other circuit requirements can be attained. The series rectifier 39 in the amplifier output return path provides the desired differential charge and discharge time constants during reception intervals.

Stable amplifier output voltage is attained by the use of a delay voltage source 40 in the output rectifier cathode circuit, this voltage being high with respect to the amplifier output return voltage required for the gain control over the expected range of gain. The steady state output level of the gain stages is fixed by the sum of the rectifier delay voltage and the grid voltage required for the necessary gain.

Initially the condensers 30, 31, following pulse transmission, are charged to some definite high negative D.C. potential. The receiver is then sensitive only to signals of high magnitude since the grids 22, 25 are biased strongly negatively. But immediately the charge on the control capacitors 30, 31 starts to drain off, with a time constant as before stated. Without reverberation the receiver gain is restored at a fixed rate as the two capacitors 30, 31 discharge through the resistor 35—38 and the system is essentially a TVG receiver. However, should reverberation of sufficient magnitude be present, the signal from the amplifier output is rectified by tube 34. This diode can reduce the rate of discharge, stop the discharge, or even increase the negative charge existing on condensers 30, 31 at any instant during the reception interval between transmissions. The tube 39 conducts only when the anode is more positive than the cathode. When the tube 39 is not conducting, the resistor 35 becomes fully effective. The chosen values of the time constants are determined in part by consideration of the character of reverberation and signal to reverberation ratio and rate of rise. In any case, the time constant of the condensers 30, 31 and resistors 35—38 combination is chosen so that the amplifier is responsive to a signal which exceeds the sensitivity level existing at a particular time, or which stands above reverberation by a chosen value.

During the transmission interval when the pinger relay 10 is energized, the effect of the resistor 35 is removed by the closing of a pinger relay contact 41, thereby reducing the charge time of the condensers 30, 31. The time constant is made low enough during transmission to permit full or virtually complete attainment of a steady state negative voltage on the capacitors corresponding to the level of the input signal. This level is chosen to be the maximum expected or tolerable reverberation. At the end of transmission the receiver is adjusted so that only a signal of the chosen amount more than that applied during transmission will actuate it.

From the foregoing it is clear that the automatic proportional preset of amplifier gain avoids dependence upon the stability of many circuit elements and voltages, and by its operation contributes toward the satisfactory operation of an echo ranging receiver under difficult conditions.

Various changes may be made in the form of invention herein shown and described without departing from the spirit of the invention or the scope of the following claims.

What is claimed is:

1. In a system of the character described, an echo signal receiver including an amplifier having an input circuit, means including a capacitor adapted to control the gain of said amplifier inversely of the charge on said capacitor, means including an amplifier output return circuit and a rectifier adapted to charge said capacitor as a function of the output of said amplifier, means normally discharging said capacitor, and means utilizing said output return circuit and gain control capacitor for automatically presetting said amplifier gain including means applying an alternating electric signal to said amplifier input circuit during an interval preceding reception.

2. In a system of the character described, an echo signal receiver including an amplifier having an input circuit, means including a capacitor adapted to control the gain of said amplifier inversely of the charge on said capacitor, means including an amplifier output return circuit and a rectifier adapted to charge said capacitor as a function of the output of said amplifier, said output return circuit including means increasing the charge time of said capacitor, means normally discharging said capacitor, and means utilizing said output return circuit and gain control capacitor for automatically presetting said amplifier gain including means applying an alternating electric signal to said amplifier input circuit during a transmission interval preceding echo signal reception and means adapted to render said charge-time-increasing means in said output return circuit ineffective during said transmission interval.

References Cited in the file of this patent

UNITED STATES PATENTS

| | | |
|---|---|---|
| 2,158,198 | Prescott | May 16, 1939 |
| 2,167,492 | Sproule | July 25, 1939 |
| 2,427,523 | Dolberg et al. | Sept. 16, 1947 |
| 2,444,721 | Blaisdell | July 6, 1948 |
| 2,498,381 | Smith | Feb. 21, 1950 |
| 2,583,531 | Hathaway | Jan. 29, 1952 |